US008752167B2

(12) United States Patent
Jin

(10) Patent No.: US 8,752,167 B2
(45) Date of Patent: Jun. 10, 2014

(54) CONTENT MANAGEMENT DEVICE AND CONTENT MANAGEMENT METHOD

(75) Inventor: Yiyi Jin, Tokyo (JP)

(73) Assignee: NEC Corporation, Tokyo (JP)

( * ) Notice: Subject to any disclaimer, the term of this patent is extended or adjusted under 35 U.S.C. 154(b) by 192 days.

(21) Appl. No.: 13/175,398

(22) Filed: Jul. 1, 2011

(65) Prior Publication Data

US 2012/0023575 A1   Jan. 26, 2012

(30) Foreign Application Priority Data

Jul. 22, 2010   (JP) ................................ 2010-165126

(51) Int. Cl.
*G06F 7/04* (2006.01)
(52) U.S. Cl.
USPC .......... 726/21; 726/29; 726/27; 726/1; 726/5; 715/200; 705/35
(58) Field of Classification Search
USPC ........ 713/160, 168, 182; 726/24–27, 21, 3–5, 726/29; 715/200
See application file for complete search history.

(56) References Cited

U.S. PATENT DOCUMENTS

| 5,675,782 | A  | * | 10/1997 | Montague et al. ................. 726/4 |
| 7,814,554 | B1 | * | 10/2010 | Ragner ............................ 726/27 |
| 7,966,644 | B2 | * | 6/2011  | Noda et al. ......................... 726/1 |
| 8,060,832 | B2 | * | 11/2011 | Kruempelmann et al. ... 715/765 |
| 8,082,337 | B1 | * | 12/2011 | Davis et al. ................... 709/223 |
| 8,122,513 | B2 | * | 2/2012  | Mihira ............................. 726/27 |
| 8,165,974 | B2 | * | 4/2012  | Privault et al. .................. 706/12 |
| 8,347,346 | B2 | * | 1/2013  | Furuichi et al. .................... 726/1 |
| 2005/0028008 | A1 | * | 2/2005 | Kumar ........................ 713/200 |
| 2005/0114672 | A1 | * | 5/2005 | Duncan et al. ................ 713/182 |
| 2007/0011212 | A1 | * | 1/2007 | Koppich et al. .............. 707/203 |
| 2007/0016583 | A1 | * | 1/2007 | Lempel et al. .................... 707/9 |
| 2007/0039045 | A1 | * | 2/2007 | McKee et al. .................. 726/21 |
| 2007/0136676 | A1 | * | 6/2007 | Kruempelmann et al. ... 715/764 |
| 2007/0143292 | A1 | * | 6/2007 | Nozaki et al. ..................... 707/9 |
| 2007/0283443 | A1 | * | 12/2007 | McPherson et al. ........... 726/26 |

(Continued)

FOREIGN PATENT DOCUMENTS

JP   2003091448 A   3/2003
JP   2008046784 A   2/2008

OTHER PUBLICATIONS

Wolfgang Prinz, Proactive support for the organization of shared workspaces, Apr. 2005, Group 05, pp. 246-255.*

*Primary Examiner* — Cordelia Zecher
*Assistant Examiner* — Viral Lakhia

(57) ABSTRACT

A content management device, includes: a folder level access control information storage unit configured to store folder level access control information indicating access rights of a user to a folder where content is stored; an access control unit configured to acquire content level access control information indicating access rights of a user to content, from a predetermined content level access control unit; and a user interface configured to output display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder.

9 Claims, 13 Drawing Sheets

| TARGET | READ-ONLY RIGHTS | ALTERATION RIGHTS | FULL RIGHTS |
|---|---|---|---|
| USER1 | ✓ | ✓ | ✓ |
| USER2 | ✓ | ✓ | --- |
| ORGA1 | ✓ | --- | --- |
| ORGA2 | --- | --- | --- |

(56) References Cited

U.S. PATENT DOCUMENTS

| | | | |
|---|---|---|---|
| 2008/0301754 A1* | 12/2008 | Furuichi et al. | 726/1 |
| 2009/0025063 A1* | 1/2009 | Thomas | 726/4 |
| 2009/0293135 A1* | 11/2009 | Nanaumi | 726/28 |
| 2010/0024011 A1* | 1/2010 | Fukuoka | 726/5 |
| 2010/0088581 A1* | 4/2010 | Koppich et al. | 715/200 |
| 2010/0153716 A1* | 6/2010 | Kirihata et al. | 713/165 |
| 2011/0320479 A1* | 12/2011 | Burris et al. | 707/769 |
| 2012/0246738 A1* | 9/2012 | Shah et al. | 726/28 |

\* cited by examiner

Fig. 2

| TARGET | READ-ONLY RIGHTS | ALTERATION RIGHTS | FULL RIGHTS |
|---|---|---|---|
| USER1 | ✓ | ✓ | ✓ |
| USER2 | ✓ | ✓ | --- |
| ORGA1 | ✓ | --- | --- |
| ORGA2 | --- | --- | --- |

Fig. 3

| TARGET | BROWSING RIGHTS | UPDATING RIGHTS | ACCESS RIGHT ALTERATION RIGHTS |
|---|---|---|---|
| USER1 | ✓ | ✓ | ✓ |
| USER2 | ✓ | ✓ | --- |
| ORGA1 | ✓ | --- | --- |
| ORGA2 | --- | --- | --- |

Fig. 4

| FOLDER LEVEL ACCESS RIGHTS (FLAC) | CONTENT LEVEL ACCESS RIGHTS (CLAC) |
|---|---|
| ACCESS RIGHT ATTRIBUTES | |
| BROWSING RIGHTS | READ-ONLY RIGHTS (CONTENT CAN BE BROWSED BUT CANNOT BE EDITED, DUPLICATED, PRINTED OR HAVE ACCESS RIGHTS ALTERED) |
| UPDATING RIGHTS | ALTERATION RIGHTS (CONTENT CAN BE BROWSED, EDITED OR DUPLICATED, BUT ACCESS RIGHTS CANNOT BE ALTERED) |
| ACCESS RIGHT ALTERATION RIGHTS | FULL RIGHTS (CONTENT CAN BE BROWSED, EDITED, DUPLICATED AND PRINTED, AND ACCESS RIGHTS CAN BE ALTERED) |
| OTHER ATTRIBUTES | |
| FOLDER ADMINISTRATOR | MAIL ADDRESS FOR REQUESTING RIGHTS |
| RETENTION DEADLINE | CONTENT RETENTION DEADLINE |

Fig. 5

| | NAME | REGISTRANT | REGISTRATION DATE/TIME | FLAC CONSISTENCY |
|---|---|---|---|---|
| C1 | MARKET TRENDS.doc | USER1 | 10/05/01 11:30 | OK |
| C2 | SALES UPDATE.xls | USER1 | 10/05/01 11:30 | OK |
| C3 | PERSONNEL CHANGES.ppt | USER1 | 10/05/01 11:30 | OK |
| C4 | BUSINESS PLAN.doc | USER1 | 10/05/01 11:30 | OK |
| C5 | CUSTOMER LIST.xls | USER1 | 10/05/01 11:30 | OK |

ROOT
— F1
— F2

Fig. 7

REFLECT ACCESS CONTROL INFORMATION OF FOLDER F1 IN CONTENT C1?

[YES]   [NO]

Fig. 9

| | | NAME | REGISTRANT | REGISTRATION DATE/TIME | FLAC CONSISTENCY |
|---|---|---|---|---|---|
| ROOT — E1 | C1 | MARKET TRENDS.doc | USER1 | 10/05/01 11:30 | NG |
| | C2 | SALES UPDATE.xls | USER1 | 10/ | OK |
| E2 | C3 | PERSONNEL CHANGES.ppt | USER1 | 10/ | OK |
| | C4 | BUSINESS PLAN.doc | USER1 | 10/ | OK |
| | C5 | CUSTOMER LIST.xls | USER1 | 10/ | OK |

Context menu:
- DELETE
- UPDATE
- CUT
- REFLECT HIGHER LEVEL FLAC
- COPY CLAC
- *PASTE CLAC*

Fig. 13

| | NAME | REGISTRANT | REGISTRATION DATE/TIME | FLAC CONSISTENCY |
|---|---|---|---|---|
| C6 | TEMPLATE | ADMIN | 10/03/01 08:30 | OK |
| C7 | EXPORT REGULATIONS.doc | USER1 | 10/05/01 11:30 | OK |

ROOT
- F1
- F2

CONTENT MANAGEMENT DEVICE AND CONTENT MANAGEMENT METHOD

This application is based upon and claims the benefit of priority from Japanese patent application No. 2010-165126, filed on Jul. 22, 2010, the disclosure of which is incorporated herein in its entirety by reference.

BACKGROUND

The present invention relates to a content management device and a content management method.

In corporate organizations, content management devices are used as countermeasures against leakage of information to carry out administration in which access control information for electronic documents and other contents is centrally managed in folder units.

However, there continues to be a large number of serious problems involving the leakage of contents containing customer information and other confidential information. Therefore, there has been increasing use in recent years of administration in which access control information is embedded in the content itself targeted for management in addition to access control information in folder units (refer to, for example, Japanese Patent Application Laid-open No. 2003-91448 and Japanese Patent Application Laid-open No. 2008-46784).

However, when access control in file units is combined with the use of access control in content units, there is the possibility of inconsistencies occurring between both forms of access control information, thereby resulting in the risk of decreased convenience and increased administrative costs.

For example, even if a user has access rights to folder where content is stored, if access rights to the content itself not assigned to that user, the fact that the use has not been assigned access rights cannot be detected until the content is opened, thereby resulting in a lack of user convenience.

In addition, the situation may also arise in which, even though access rights to the content itself may have been granted, if a user does not have access rights to the folder where the content is stored, the content cannot be accessed.

In this manner, there is the risk of unforeseen leakage of information in situations in which there is an absence of consistency between access control information for folders where content is stored and access control information for the content itself.

Thus, in the case of combining the use of access control in folder units and access control in content units, it is necessary to develop measures such as investigating the consistency between access control information for folders where content is stored and access control information for the content itself, and changing access control information in the absence of consistency as necessary.

For example, in the document management system disclosed in Japanese Patent Application Laid-open No. 2003-91448, access rights can be set collectively after having selected a plurality of documents or folders. In addition, at this time, access rights for security levels below the selected folder can also be changed. However, in the case of this type of configuration, although access rights of selected files or folders can be changed collectively, it is not possible to confirm the consistency status between access rights to folders and access rights to documents within those folders, thereby making it difficult to precisely manage access rights.

In addition, in the document management device disclosed in Japanese Patent Application Laid-open No. 2008-46784, as a result of carrying out an interlinked operation setting for a plurality of documents, when an access right to a certain document has been changed, the access rights of other documents are also changed in coordination therewith. However, in this type of configuration, it is necessary to carry out an interlinked operation setting, thereby making management of access control complex.

In particular, in the case of managing access rights in folder units and access rights in content unit using respectively different devices, it is not easy to manage both types of access rights while maintaining consistency there between.

SUMMARY

An exemplary object of the present invention is, in an environment that combines the use of access rights in folder units and access rights in content units, to enable both types of access rights to be managed precisely and easily.

A content management device according to one aspect of the present invention includes: a folder level access control information storage unit configured to store folder level access control information indicating access rights of a user to a folder where content is stored; an access control unit configured to acquire content level access control information indicating access rights of a user to content, from a predetermined content level access control unit; and a user interface configured to output display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder.

DESCRIPTION OF THE DRAWINGS

FIG. 2 is a drawing showing an example of a portion of content level access control information;

FIG. 3 is a drawing showing an example of a portion of folder level access control information;

FIG. 4 is a drawing showing an example of a mapping table;

FIG. 5 is a drawing showing an example of an operating screen displayed on a client device;

FIG. 7 is a drawing showing an example of a screen used by a user to confirm whether or not FLAC information of a folder has been reflected in CLAC information of content;

FIG. 9 is a drawing showing an example of an operating screen when FLAC information of a folder is reflected in content;

FIG. 13 is a drawing showing an example of an operating screen after CLAC information of template content has been reflected in content.

EXEMPLARY EMBODIMENT

The following provides an explanation of an information processing system that includes a content management device that is one embodiment of the present invention.

System Configuration

Figure 1:
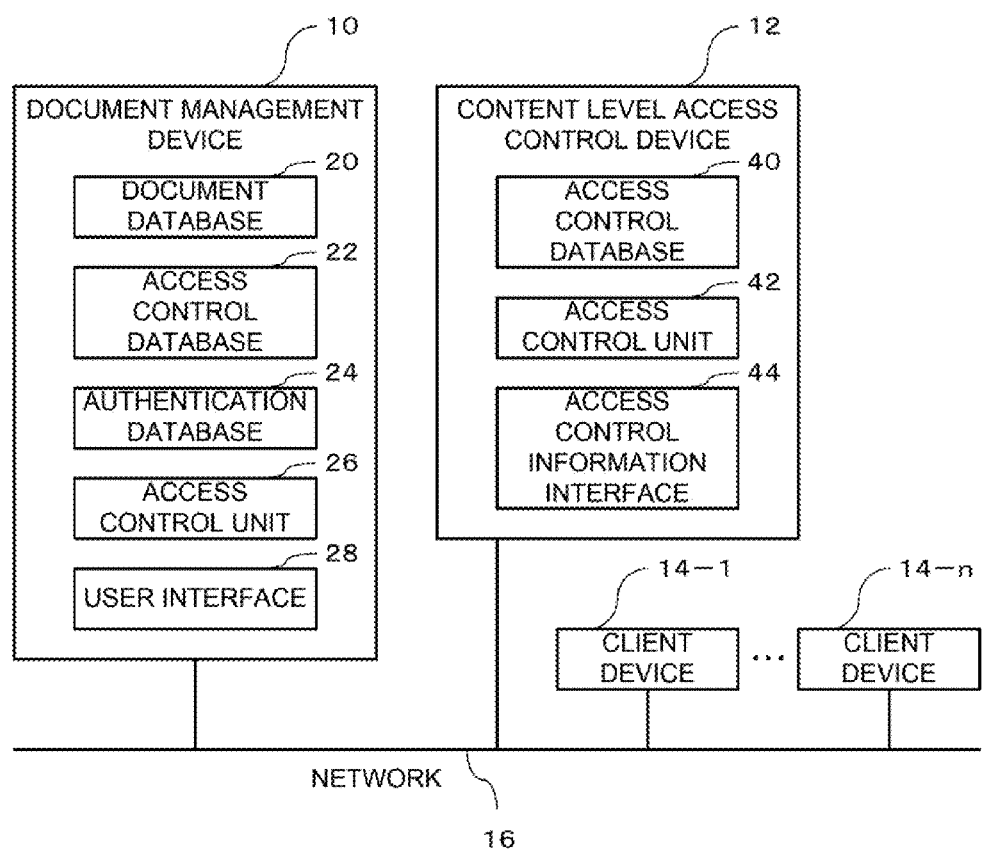
FIG. 1 is a drawing showing the configuration of an information, processing system according to the present embodiment.

FIG. 1 shows the configuration of an information processing system according to the present embodiment. This information processing system is configured to include a document management device (content management device) 10, a content level access control device 12, a plurality of client devices 14-1 to 14-n, and a network 16.

The document management device 10 is a server that centrally manages a plurality of digital content files (to be referred to as content) shared among a plurality of users, and has a function that carries out access control at the folder level where the content is stored in order to prevent information leakage. Here, content managed by the document management device 10 is not limited to so-called document files including text, images, tables and the like, but rather include various forms of files such as image files, video files or audio files.

Furthermore, in the present embodiment, a method for carrying out access control in file units in the document management device 10 is referred to as a "folder level access control method".

As shown in FIG. 1, the document management device 10 is configured to include a document database 20, an access control database 22, an authentication database 24, an access control unit 26 and a user interface 28.

Here, the document management device 10 is provided with a CPU and storage device as hardware components, while the document database 20, the access control database 22 and the authentication database 24 are realized using storage devices, and the access control unit 26 and the user interface 28 are realized by the CPU executing programs stored in a storage device. Details of each component of the document management device 10 will be subsequently described.

The content level access control device 12 is an information processing device that has a function that carries out access control at the content level. Furthermore, content in the present embodiment includes the content itself as well as capsule content for wrapping the content.

As shown in FIG. 1, the content level access control device 12 is configured to include an access control database 40, an access control unit 42, and an access control information interface 44. Furthermore, the content level access control device 12 is provided with a CPU and storage device as hardware components, while the access control database 40 is realized by using a storage device, and the access control unit 42 and the access control information interface 44 are realized by the CPU executing programs stored in a storage device.

The access control database 40 stores content level access control (CLAC), information indicating access rights for each content by correlating with a content identifier (such as a file name or digital object identifier). FIG. 2 shows an example of a portion of the CLAC information. As shown in FIG. 2, the CLAC information includes information indicating an identifier of a user or organization targeted for access control (such as a user ID or organization ID) and access rights for each target. In the example shown in FIG. 2, access rights include "read only rights" that allow content to be accessed, "alteration rights" that allow content to be altered, and "full rights" that allow all forms of manipulation of content, and the presence and absence of these access rights are set with check marks and bars ("v" and "---") in the CLAC information. The CLAC information also includes a mail address used when requesting access rights and information indicating the content retention deadline.

Returning to FIG. 1, the access control unit 42 confirms access rights for content and authorizes access within the range of those access rights based on CLAC information stored in the access control database 40 when the content is accessed by a user.

The access control information interface 44 is an interface for transmitting and receiving CLAC information with the document management device 10.

Furthermore, in the present embodiment, a method for carrying out access control in content units in the content level access control device 12 is referred to as a "content level access control method". The content level access control method realizes permanent protection of security policies so as to prevent unauthorized use of content itself irrespective of whether the content is accessed online or offline.

The client device 14-i (i=1 to n) is an information processing device used by a user when accessing content, and consists of, for example, a personal computer or Smartphone. Users of the client device 14-i are able to access content stored in the document management device 10 via the network 16. Furthermore, access to content is controlled by access control in folder units by the document management device 10 and access control in content units by the content level access control device 12.

The network 16 mutually and communicably connects the document management device 10, the content level access control device 12 and the client device 14-i, and for example, enables communication according to a transmission control protocol/Internet protocol (TCP/IP). Furthermore, the network 16 may also be a local area network (LAN) or Intranet confined to within a corporate organization, or an open network such as the Internet.

Continuing, the following provides an explanation of the details of each component of the document management device 10.

The document database 20 stores a plurality of contents accessed by a plurality of users using the client devices 14-1 to 14-n. Here, the document database 20 stores a hierarchical structure of folders serving as receptacles that store the contents, and each content is stored in the document database 20 in a form of being stored in any of the folders.

The access control database 22 stores folder level access control (FLAG) information indicating access rights for each folder in correlation with a folder identifier (such as a folder path name). FIG. 3 shows an example of a portion of the FLAC information. As shown in FIG. 3, the FLAC information includes information indicating an identifier of a user or organization targeted for access control (such as a user ID or organization ID) and access rights for each target. In the example shown in FIG. 3, access rights include "browsing rights" that allow folders to be browsed, "updating rights" that allow folders to be updated, and "access right updating rights" that allow folder access rights to be updated, and the presence and absence of these access rights are set with check marks and bars ("v" and "---") in the FLAC information. The FLAC information also includes information indicating the folder administrator and information indicating the folder retention deadline.

In addition, the access control database 22 also stores mapping tables for mapping FLAC information and CLAC information. As shown in FIGS. 2 and 3, there are differences in the types of access rights between FLAC information and CLAC information. In other words, in contrast to FLAC information consisting of browsing rights, updating rights and access right alteration rights, CLAC information consists of read-only rights, alteration rights and full rights. Therefore, the mapping tables are used to indicate correlations between the rights included in FLAC information and the rights included in CLAC information. FIG. 4 shows an example of a mapping table. As shown in FIG. 4, attribute information indicating access rights in FLAC information consisting of browsing rights, updating rights and access right alteration rights respectively corresponds to the attribute information consisting of read-only rights, alteration rights and full rights indicating access rights in the CLAC information. In addition, other attribute information in the FLAC information consisting of folder administrator and retention deadline respectively corresponds to the mail address used when requesting access rights and the content retention deadline of the other attribute information in the CLAC information.

In addition, template content, which defines CLAC information that is consistent with FLAC information of a certain folder, can be registered in the access control database 22. By registering the template content in this manner, CLAC information can be copied from the template content and duplicated in another content, thereby realizing accurate and convenient setting of CLAC information.

Returning to FIG. 1, authentication information (such as user IDs and passwords) when a user accesses the document management device 10 is registered in the authentication database 24.

The access control unit 26 confirms access rights for a certain folder and authorizes access within the scope of those access rights based on FLAC information stored in the access control database 22 when that folder is accessed by a user. In addition, the access control unit 26 has a function that allows it to acquire CLAC information from the access control database 40 of the content level access control device 12, and confirm whether or not an inconsistency has occurred in access rights between FLAC information and CLAC information. Moreover, the access control unit 26 has a function that allows it to eliminate inconsistencies corresponding to a user operation in the case an inconsistency has occurred in access rights between FLAC information and CLAC information.

The user interface 28 is an interface that provides an operating screen for accessing the document management device 10 by a user. FIG. 5 shows an example of an operating screen displayed on the client device 14-I by the user interface 28. As shown in FIG. 5, folders are displayed in a hierarchical manner on the operating screen, and the content stored in a selected folder (folder F1 in FIG. 5) is displayed in list form. Names (file names), registrants, registration dates and times and FLAC consistency are indicated as folder information for each content. Here, FLAC consistency refers to that indicating the state of consistency of access rights between FLAC information and CLAC information as confirmed by the access control unit 26, and is displayed as OK (consistent) or NG (inconsistent). A user is able to browse or update content, or change content access rights by manipulating folders and content displayed on the operating screen. Furthermore, in the example shown in FIG. 5, the FLAC information of folder F1 is consistent with the CLAC information of each content C1 to C5 located below folder F1, and OK is indicated for every content with respect to FLAC consistency.

Here, the screen displayed on the client device 14-*i* by the user interface 28 is displayed when, for example, the document management device 10 is accessed using a web browser of the client device 14-*i*. In this case, the user interface 28 transmits data in HTML format or XML format to the client device 14-*i* for displaying the operating screen on the web browser in response to a request from the client device 14-*i*. Furthermore, a client program that displays the operating screen for accessing the document management device 10 can be installed in the client device 14-*i*, and this program can be configured to communicate with the user interface 28 of the document management device 10. In either case, the user interface 28 functions in the same manner with respect to outputting display data for displaying the operating screen on the client device 14-*i*.

Access Control Information Updating Processing

Next, an explanation is provided of processing for ensuring consistency between CLAC information and FLAC information corresponding to a user operation. Furthermore, this processing is premised on a certain user having logged in to the document management device 10 using the client device 14-*i*.

Figure 6:
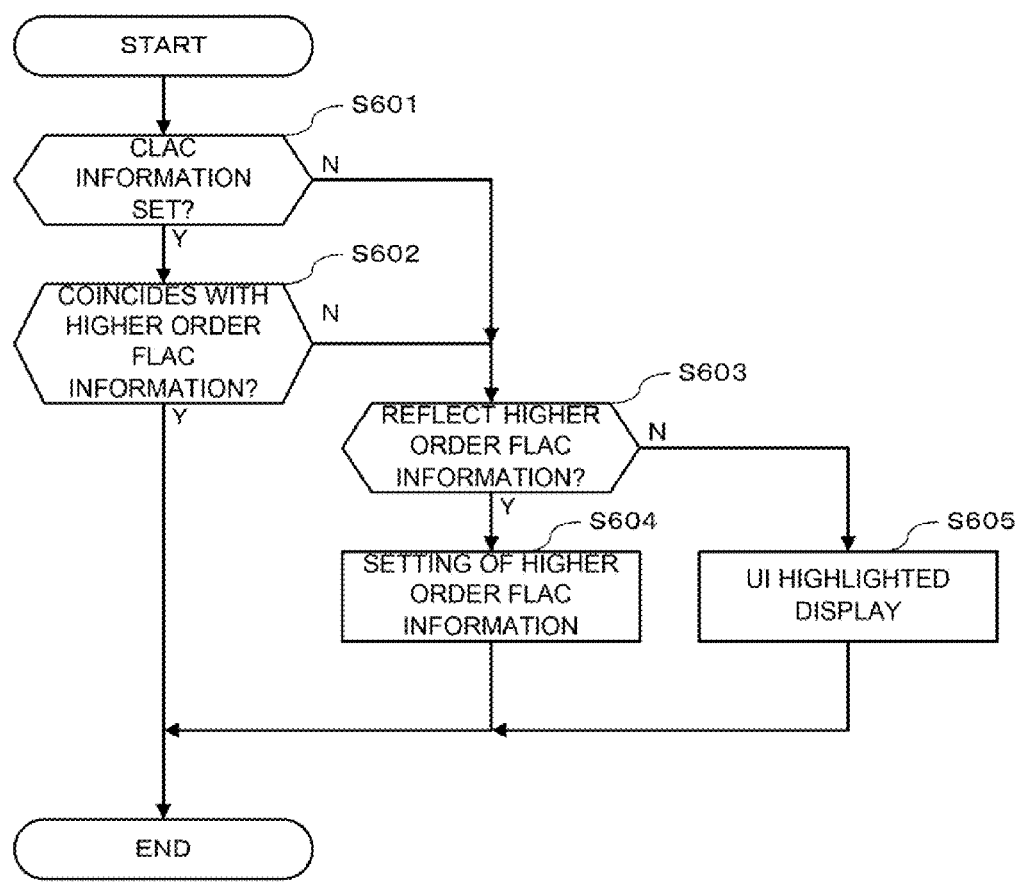
FIG. 6 is a flow chart showing an example of processing for updating access control information.

FIG. 6 is a flow chart showing an example of processing that updates access control information. First, an operating screen like that shown in FIG. 5 is displayed on the client device 14-*i* when a user accesses the user interface 28 of the document management device 10 using the client device 14-*i*. At this time, the user interface 28 of the document management device 10 transmits data for updating the display of the operating screen to the client device 14-*i* as necessary corresponding information transmitted from the client device 14-*i* in response to a user operation. In addition, the access control unit 26 coordinates with the user interface 28 and acquires CLAC information of content displayed on the operating screen from the content access control device 12, determines consistency with folder FLAG information (FLAG information of a higher level), and then outputs that result to the user interface 28.

The user is then assumed to perform an operation for storing the content C1 in folder F1 on the operating screen displayed on the client device 14-*i*. When this operation information is received by the user interface 28, the access control unit 26 confirms whether or not CLAC information has been set for the content by accessing the content level access control device 12 (S601).

In the case CLAC information has been set (Y in S601), the access control unit 26 further confirms whether or not FLAC information and CLAC information coincide (S602). Furthermore, the access control unit 26 is able to determine whether or not FLAC information and CLAC information coincide by comparing access rights information contained in the FLAG information and access rights information contained in the CLAC information using the mapping table shown in FIG. 4.

In the case the FLAG information and the CLAC information coincide (Y in S602), processing accompanying the addition of the content C1 ends, and for example, the operating screen shown in FIG. 5 is displayed. At this time, since the FLAC information of folder F1 and the CLAC information of content C1 coincide, FLAC consistency is displayed as OK.

In the case CLAC information has not been set (N in S601) or if FLAC information and CLAC information do not coincide (N in S602), the user interface 28 outputs data for displaying a screen for confirming with the user whether or not FLAC information of folder F1 is to be reflected in CLAC information of content C1 as shown in FIG. 7, for example (S603).

If the "YES" button is pressed on the screen shown in FIG. 7 (Y in 603), the access control unit 26 converts FLAC information of folder F1 to CLAC information based on the mapping table, and outputs instructions for setting the CLAC information obtained by this conversion for content C1 to the content level access control device 12 (S604). As a result, the FLAG information of folder F1 and the CLAC information of content C1 coincide, and the operating screen shown in FIG. 5, for example, is displayed.

Figure 8:
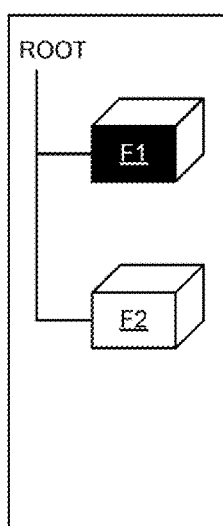
FIG. 8 is a drawing showing an example of an operating screen that indicates whether an inconsistency has occurred between FLAC information of a folder and CLAC information of content.

On the other hand, if the "NO" button is pressed on the screen shown in FIG. 7 (N in S603), content C1 that does not have CLAC information, or content C1 having CLAC information that does not coincide with the FLAC information of folder F1 is registered below the folder F1. At this time, the user interface 28 outputs data that provides a display indicating that an inconsistency has occurred between FLAC information of folder F1 and CLAC information of content C1. For example, as shown in FIG. 8, on the operating screen displayed on the client device 14-i, content C1 is highlighted, and together with "NG" being displayed for FLAC consistency for content C1, since content is present below folder F1 for which FLAC consistency has been displayed as "NG" with respect to folder F1 as well, the icon of the folder F1 is also highlighted (S605).

As a result of providing this highlighted displayed, a user is able to easily recognize that an inconsistency has occurred between FLAC information of folder F1 and CLAC information of content C1. In the case the user has performed an operation for accessing the content C1 while in this state, the user interface 28 can also output a warning message indicating that CLAC information of the content C1 does not coincide with the FLAG information of the folder F1.

The user then, for example, selects "Reflect higher order FLAC" from a context menu by right-clicking on the content C1 for which FLAC consistency has been determined to be "NG" on the operating screen as shown in FIG. 9. When this operation is received by the user interface 28, the access control unit 26 converts FLAG information in the folder F1 to CLAC information based on the mapping table, and outputs instructions for setting CLAC information resulting from this conversion for the content C1 to the content level access control device 12. The FLAG information of the folder F1 and the CLAC information of the content C1 now coincide, and the operating screen shown in FIG. 5, for example, is displayed.

Figure 10:
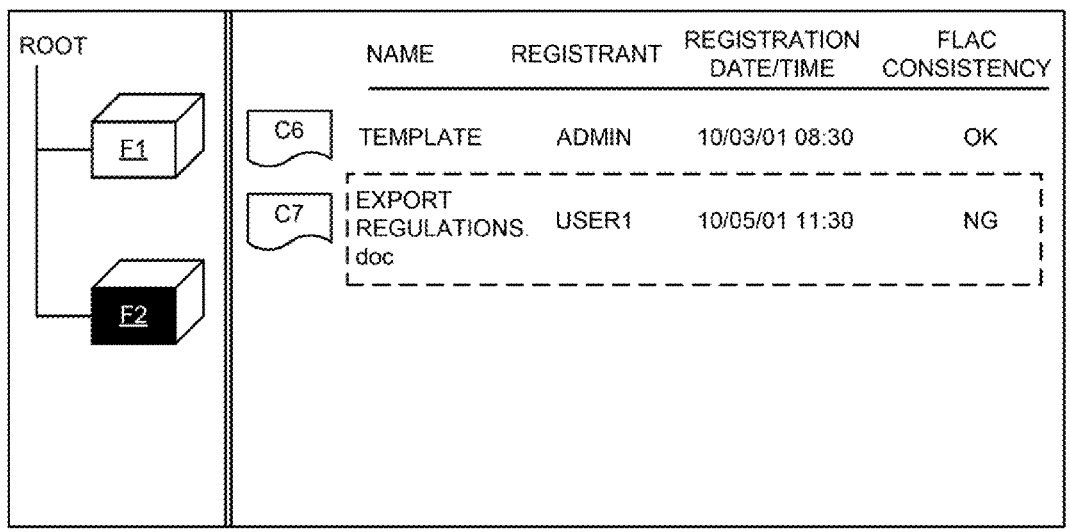
FIG. 10 is a drawing showing an example of an operating screen that indicates whether or not an inconsistency has occurred between FLAC information of a folder and CLAC information of content.
Figure 11:
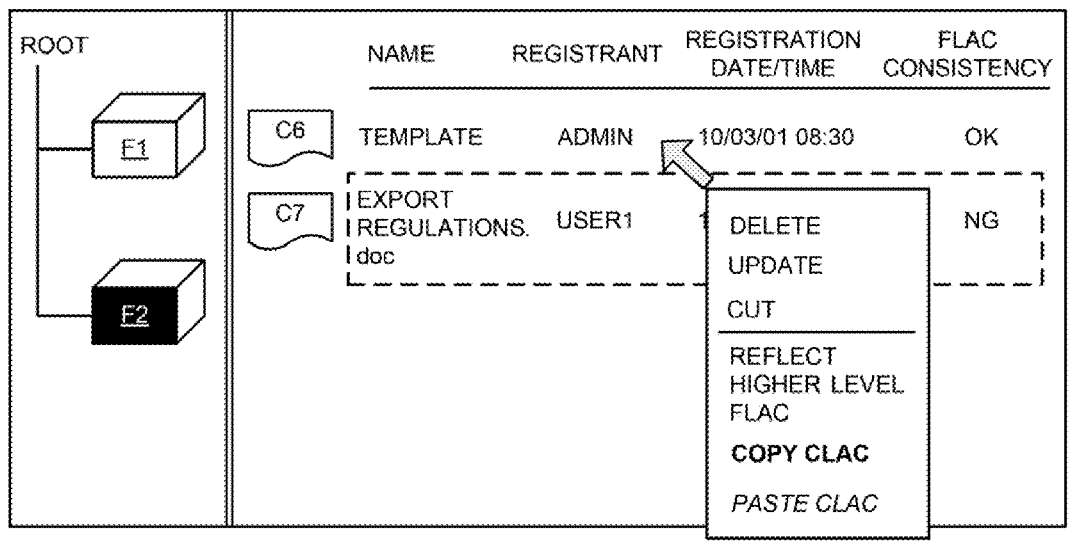
FIG. 11 is a drawing showing an example of an operating screen when CLAC information of template content is reflected in content.
Figure 12:
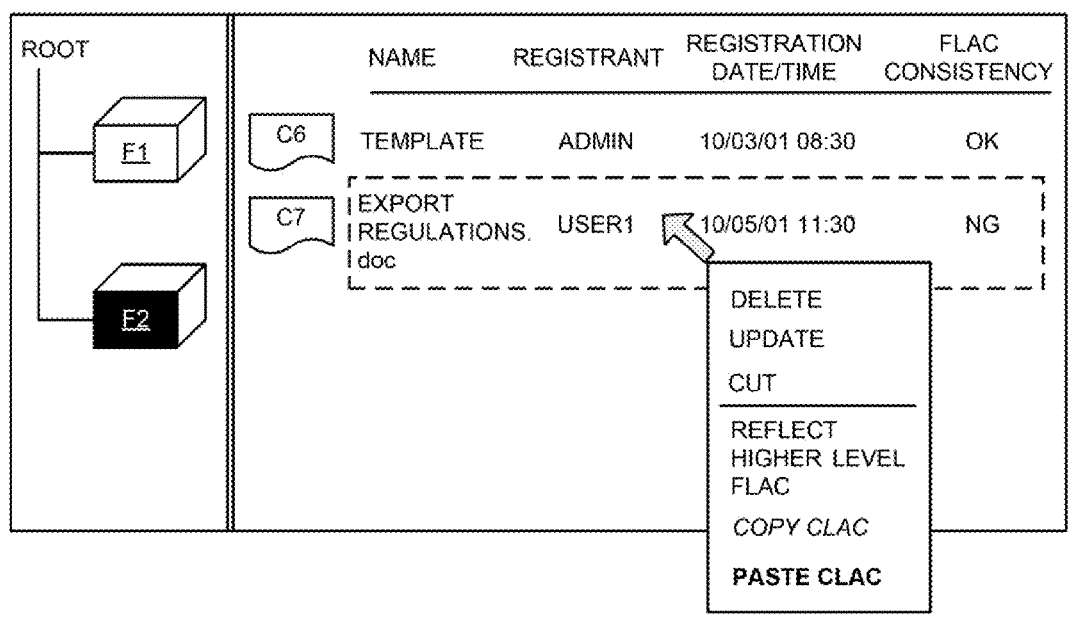
FIG. 12 is a drawing showing an example of an operating screen when CLAC information of template content is reflected in content.

In addition, in the case an inconsistency has occurred between FLAC information and CLAC information, CLAC information can also be updated using template content. For example, assume the case in which an inconsistency has occurred between FLAC information of folder F2 and CLAC information of content C7, and the folder F2 and the content C7 have been highlighted (S605) as shown in FIG. 10. In this example, template content C6 for which CLAC information has been set that coincides with the FLAC information of folder F2 is registered below the folder F2. A user right-clicks the template content C6 on an operating screen as shown in FIG. 11, for example, and selects "Copy CLAC" from the context menu. Continuing, the user then right-clicks on the content C7 for which FLAC consistency is indicated as being "NG" on an operating screen as shown in FIG. 12, for example, and selects "Paste CLAC" from the context menu. When this series of operations is received by the user interface 28, the access control unit 26 instructs CLAC information of the template content C6 to be set for content C7 to the context table access control device 12. As a result, the FLAC information of the folder F2 and the CLAC information of the content C7 coincide, and the operating screen shown in FIG. 13, for example, is displayed.

The above has provided an explanation of the information processing system of the present embodiment. According to the information processing system of the present embodiment, FLAC consistency is displayed on an operating screen. Consequently, a user is able to easily confirm whether or not an inconsistency has occurred between FLAG information and CLAC information by confirming whether "OK" or "NG" is displayed for FLAC consistency.

Moreover, in the information processing system of the present embodiment, in the case an inconsistency has occurred between FLAC information and CLAC information, the folder and content for which the inconsistency has occurred are highlighted. As a result, a user is able to determine at a glance the folder and content for which the inconsistency has occurred.

In addition, in the information processing system of the present embodiment, in the case an inconsistency has occurred between FLAC information and CLAC information, the FLAC information and CLAC information can be caused to coincide by a simply operation on an operating screen. In this manner, a user is able to reflect FLAC information in content of the document management device 10 with a single operation.

In addition, in the information processing system of the present embodiment, when content is added to a folder, whether or not the access rights of the content are caused to coincide with the access rights of a folder can be selected by a user. In the case the user has selected that the access rights of the content be caused to coincide with the access rights of the folder, the access rights of the content can be caused to coincide with the access rights of the folder. In this manner, when registering content in the document management device 10, whether or not FLAC information set for a folder where the content is stored is reflected in the content can be specified at the discretion of the user.

As has been described above, according to the information processing system of the present embodiment, FLAC information and CLAC information can be transversely extracted and controlled, thereby making it possible to improve user operability and actualize blind spots in security attributable to inconsistencies in access rights in environments in which multiple security control systems are used in combination in the manner of a security system in folder units implemented by the document management device 10 and a security control system in content units implemented by the content level access control device 12. In other words, in an environment in which access rights in folder units and access rights in file units are used in combination, both types of access rights can be managed precisely and easily.

In addition, in the information processing system of the present embodiment, management of access control information by users can be facilitated by distributing access control information to users in the form of templates.

In addition, in the information processing system of the present embodiment, in the case content is attempted to be accessed in a state in which an inconsistency has occurred between FLAC information and CLAC information, a warning message indicating that an inconsistency has occurred between FLAG information and CLAC information can also be output. As a result, the occurrence of an inconsistency between FLAC information and CLAC information can be allowed to be recognized even more easily by a user, thereby making it possible to prevent inadvertent leakage of information.

Furthermore, the present invention is intended to facilitate an understanding of the present invention, and should not be interpreted as limiting. The present invention can be altered or modified provided such alterations or modifications do not deviate from the gist thereof, and their equivalents are also included in the present invention.

For example, although folders and content are highlighted in the present embodiment in cases in which an inconsistency has occurred between FLAC information and CLAC information, the manner of display is not limited thereto, but rather a different manner of display may be used for other folders and contents.

Although a portion or all of the previously described embodiments are described in the manner of the following supplements, the embodiments are not limited thereto.

(Supplement 1) A content management device, including: a folder level access control information storage unit configured to store folder level access control information indicating access rights of a user to a folder where content is stored; an access control unit configured to acquire content level access control information indicating access rights of a user to content, from a predetermined content level access control unit; and a user interface configured to output display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder.

(Supplement 2) The content management device according to Supplement 1, wherein the user interface is configured to output display data for displaying a folder for which an inconsistency has occurred in access rights, in a different display form from that of a folder for which an inconsistency in access rights has not occurred.

(Supplement 3) The content management device according to Supplement 1, wherein the user interface is configured to output display data for displaying content for which an inconsistency has occurred in access rights, in a different display form from that of content for which an inconsistency in access rights has not occurred.

(Supplement 4) The content management device according to Supplement 1, wherein the user interface is configured to receive an operation for causing access rights of content for which an inconsistency has occurred in access rights to coincide with access rights of a folder where the content is stored, and the access control unit is configured to output instructions, to the content level access control unit, for updating the content level access control information such that the access rights of the content coincide with the access rights of the folder based on the access control information of the folder, in response to the operation.

(Supplement 5) The content management device according to Supplement 1, wherein when content is added to a folder, the user interface is configured to output display data for displaying a screen for selecting whether or not access rights of the content are caused to coincide with access rights of the folder, and in the case the access rights of the content are selected to coincide with the access rights of the folder on the screen, the access control unit is configured to output instructions, to the content level access control unit, for storing content level access control information of the content such that the access rights of the content coincide with the access rights of the folder based on the access control information of the folder.

(Supplement 6) The content management device according to Supplement 1, wherein the user interface is configured to receive an operation for causing access rights of content for which an inconsistency has occurred in access rights to coincide with access rights of content which is stored in the same folder as the content and for which an inconsistency has not occurred in access rights, and the access control unit is configured to output instructions, to the content level access control unit, for updating the content level access control information of the content for which an inconsistency has occurred in access rights such that the access rights of the content for which an inconsistency has occurred in access rights coincide with the access rights of the content for which an inconsistency has not occurred in access rights, in response to the operation.

(Supplement 7) The content management device according to Supplement 1, wherein when receiving an operation for content for which an inconsistency has occurred in access rights, the user interface is configured to output display data for displaying that an inconsistency has occurred in access rights.

(Supplement 8) The content management device according to Supplement 1, wherein the content level access control unit is provided in a different device from the content management device.

(Supplement 9) A content management method, including the steps of: acquiring folder level access control information indicating access rights of a user to a folder where content is stored, from a folder level access control information storage unit; acquiring content level access control information indicating access rights of a user to content, from a content level access control unit; and outputting display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder.

(Supplement 10) A recording medium storing a program for causing a content management device to realize: a function for storing folder level access control information indicating access rights of a user to a folder where content is stored; a function for acquiring content level access control information indicating access rights of a user to content, from a prescribed content level access control unit; and a function for outputting display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

I claim:

1. A content management device, comprising:
 a folder level access control information storage unit configured to store folder level access control information indicating access rights of a user to a folder where content is stored;
 an access control unit configured to acquire content level access control information indicating access rights of a user to content, from a predetermined content level access control unit; and a user interface configured to output display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder, wherein, the user interface is configured to receive an operation for causing access rights of content for which an inconsistency has occurred in access rights to coincide with access rights of content which is stored in the same folder as the content and for which an inconsistency has not occurred in access rights, and the access control unit is configured to output instructions, to the content level access control unit, for updating the content level access control information of the content for which an inconsistency has occurred in access rights such that the access rights of the content for which an inconsistency has occurred in access rights coincide with the access rights of the content for which an inconsistency has not occurred in access rights, in response to the operation.

2. The content management device according to claim 1, wherein
the user interface is configured to output display data for displaying a folder for which an inconsistency has occurred in access rights, in a different display form from that of a folder for which an inconsistency in access rights has not occurred.

3. The content management device according to claim 1, wherein
the user interface is configured to output display data for displaying content for which an inconsistency has occurred in access rights, in a different display form from that of content for which an inconsistency in access rights has not occurred.

4. The content management device according to claim 1, wherein
the user interface is configured to receive an operation for causing access rights of content for which an inconsistency has occurred in access rights to coincide with access rights of a folder where the content is stored, and
the access control unit is configured to output instructions, to the content level access control unit, for updating the content level access control information such that the access rights of the content coincide with the access rights of the folder based on the access control information of the folder, in response to the operation.

5. The content management device according to claim 1, wherein
when content is added to a folder, the user interface is configured to output display data for displaying a screen for selecting whether or not access rights of the content are caused to coincide with access rights of the folder, and
in the case the access rights of the content are selected to coincide with the access rights of the folder on the screen, the access control unit is configured to output instructions, to the content level access control unit, for storing content level access control information of the content such that the access rights of the content coincide with the access rights of the folder based on the access control information of the folder.

6. The content management device according to claim 1, wherein
when receiving an operation for content for which an inconsistency has occurred in access rights, the user interface is configured to output display data for displaying that an inconsistency has occurred in access rights.

7. The content management device according to claim 1, wherein
the content level access control unit is provided in a different device from the content management device.

8. A content management method performed by a content management device, comprising the steps of:
acquiring folder level access control information indicating access rights of a user to a folder where content is stored, from a folder level access control information storage unit;
acquiring content level access control information indicating access rights of a user to content, from a content level access control unit;
outputting display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder;
receiving an operation for causing access rights of content for which an inconsistency has occurred in access rights to coincide with access rights of content which is stored in the same folder as the content and for which an inconsistency has not occurred in access rights; and
outputting instructions for updating the content level access control information of the content for which an inconsistency has occurred in access rights such that the access rights of the content for which an inconsistency has occurred in access rights coincide with the access rights of the content for which an inconsistency has not occurred in access rights, in response to the operation.

9. A non-transitory computer-readable recording medium storing a program for causing a content management device to realize:
a function for storing folder level access control information indicating access rights of a user to a folder where content is stored;
a function for acquiring content level access control information indicating access rights of a user to content, from a prescribed content level access control unit;
a function for outputting display data for displaying a hierarchical structure between at least one folder and at least one content stored in the at least one folder, along with information indicating whether or not an inconsistency has occurred in access rights between the folder level access control information of the at least one folder and the content level access control information of the content stored in the at least one folder;
a function for receiving an operation for causing access rights of content for which an inconsistency has occurred in access rights to coincide with access rights of content which is stored in the same folder as the content and for which an inconsistency has not occurred in access rights; and
a function for outputting instructions for updating the content level access control information of the content for which an inconsistency has occurred in access rights such that the access rights of the content for which an inconsistency has occurred in access rights coincide with the access rights of the content for which an inconsistency has not occurred in access rights, in response to the operation.

* * * * *